(12) United States Patent
Tanielyan et al.

(10) Patent No.: US 9,018,127 B2
(45) Date of Patent: Apr. 28, 2015

(54) PREPARATION OF CATALYST FOR SELECTIVE HYDROGENATION OF HYDROGENATABLE PRECURSORS

(71) Applicant: BioAmber International S.à.r.l., Luxembourg (LU)

(72) Inventors: Setrak K. Tanielyan, Maplewood, NJ (US); Robert L. Augustine, Livingston, NJ (US); Leo E. Manzer, Wilmington, DE (US); James F. White, Richland, WA (US); Ramesh D. Bhagat, Newark, NJ (US); Balaraju Miryala, Newark, NJ (US)

(73) Assignee: BioAmber International S.a.r.l., Luxembourg (LU)

( * ) Notice: Subject to any disclaimer, the term of this patent is extended or adjusted under 35 U.S.C. 154(b) by 58 days.

(21) Appl. No.: 13/736,229

(22) Filed: Jan. 8, 2013

(65) Prior Publication Data

US 2013/0184499 A1    Jul. 18, 2013

Related U.S. Application Data

(60) Provisional application No. 61/585,819, filed on Jan. 12, 2012.

(51) Int. Cl.
| | | |
|---|---|---|
| *B01J 21/18* | (2006.01) | |
| *B01J 23/00* | (2006.01) | |
| *B01J 23/40* | (2006.01) | |
| *B01J 23/74* | (2006.01) | |
| *B01J 27/20* | (2006.01) | |
| *B01J 37/06* | (2006.01) | |
| *B01J 37/12* | (2006.01) | |
| *B01J 37/28* | (2006.01) | |
| *B01J 23/656* | (2006.01) | |
| *B01J 37/02* | (2006.01) | |

(52) U.S. Cl.
CPC  *B01J 27/20* (2013.01); *B01J 37/06* (2013.01); *B01J 37/12* (2013.01); *B01J 37/28* (2013.01); *B01J 21/18* (2013.01); *B01J 23/6567* (2013.01); *B01J 37/0201* (2013.01); *B01J 37/0213* (2013.01)

(58) Field of Classification Search
USPC .......................................... 502/180, 182, 185
See application file for complete search history.

(56) References Cited

U.S. PATENT DOCUMENTS

| | | | |
|---|---|---|---|
| 3,478,112 A | 11/1969 | Adam et al. | |
| 3,752,861 A | 8/1973 | Hobbs et al. | |
| 3,855,319 A | 12/1974 | Hobbs et al. | |
| 4,052,336 A * | 10/1977 | van Montfoort et al. | 502/185 |
| 4,111,842 A * | 9/1978 | van Montfoort et al. | 502/183 |
| 4,482,764 A | 11/1984 | Herrmann et al. | |
| 4,837,189 A * | 6/1989 | Simon et al. | 502/150 |
| 5,478,952 A | 12/1995 | Schwartz | |
| 5,827,795 A * | 10/1998 | Matviya et al. | 502/180 |
| 6,008,384 A | 12/1999 | Bockrath et al. | |
| 6,277,780 B1 * | 8/2001 | Beckler et al. | 502/180 |

FOREIGN PATENT DOCUMENTS

| | | | |
|---|---|---|---|
| JP | 2003-024791 | 1/2003 | |
| WO | 2011/123270 | 10/2011 | |
| WO | 2013/106519 | * 7/2013 | B01J 23/656 |

* cited by examiner

*Primary Examiner* — Patricia L Hailey
(74) *Attorney, Agent, or Firm* — Paula Degrandis (57) ABSTRACT

A reduced metallic catalyst or pre-activated catalyst is formed by contacting a precursor catalyst or a reduced metallic catalyst with a modifier solution in the presence of a source of hydrogen and heat treating the precursor catalyst or the reduced metallic catalyst at super-atmospheric pressure to obtain the reduced metallic catalyst from the precursor catalyst or the pre-activated catalyst from the reduced metallic catalyst. A method of hydrogenating a hydrogenatable precursor includes providing a reduced metallic catalyst or the pre-activated catalyst prepared with modifier buffer and contacting the reduced metallic catalyst or pre-activated catalyst with the hydrogenatable precursor in the presence of hydrogen and, optionally, in the presence of a modifier solution.

6 Claims, 8 Drawing Sheets

PREPARATION OF CATALYST FOR SELECTIVE HYDROGENATION OF HYDROGENATABLE PRECURSORS

RELATED APPLICATION

This nonprovisional application is based upon and claims the benefit of priority from U.S. Application No. 61/585,819, filed Jan. 12, 2012, the disclosure of which is incorporated herein by reference.

TECHNICAL FIELD

This disclosure relates to the preparation of catalysts for the selective hydrogenation of hydrogenatable precursors.

BACKGROUND

Dicarboxylic acids, such as adipic acid, malic acid, fumaric acid and succinic acid are potential precursors for numerous chemicals. For example, succinic acid can be converted into 1,4-butanediol (BDO), tetrahydrofuran (THF), and gamma-butyrolactone (GBL) by hydrogenation reactions. Conventional methods may use gas phase hydrogen and deionized (DI) water as the medium for preparing reduced or pre-activated metallic catalysts. For example, U.S. Pat. No. 6,008,384, herein incorporated by reference in its entirety, discloses a process for preparing metallic catalysts using deionized water during the reduction procedure.

However, a variety of by-products, such as cyclic or linear ethers, acetals and low molecular alcohols, may be formed during the hydrogenation of some dicarboxylic acids to the corresponding diols. In the case of maleic, succinic and fumaric acids, such conventional methods results in the formation of significant amounts of THF or other by-products rather than the desired BDO. This necessitates additional separation steps to isolate the desired product from by-products, loss of yield and increased production cost.

Accordingly, there is a need for a means to achieve further improved selectivity in hydrogenation of hydrogenatable precursors to the desired product that avoids the formation of unwanted by-products.

SUMMARY

We provide methods of preparing a reduced metallic catalyst comprising contacting a metallic precursor catalyst with a modifier solution in the presence of hydrogen and heat treating the metallic precursor catalyst at super-atmospheric pressure to obtain the reduced metallic catalyst.

We also provide methods of preparing a pre-activated catalyst comprising contacting the reduced catalyst with a modifier solution in the presence of hydrogen and heat treating the reduced catalyst at super-atmospheric pressure to obtain the pre-activated catalyst.

We further provide a reduced metallic catalyst or pre-activated catalyst prepared by contacting a precursor catalyst or a reduced metallic catalyst with a modifier solution in the presence of a source of hydrogen and heat treating the precursor catalyst or the reduced metallic catalyst at super-atmospheric pressure to obtain the reduced metallic catalyst from the precursor catalyst or the pre-activated catalyst from the reduced metallic catalyst.

We still further provide methods of hydrogenating a hydrogenatable precursor comprising providing a reduced metallic catalyst or the pre-activated catalyst prepared with modifier buffer and contacting the reduced metallic catalyst or pre-activated catalyst with the hydrogenatable precursor in the presence of hydrogen and, optionally, in the presence of a modifier solution.

TABLE 1

Examples of modifier solutions

| Modifier Solutions | Preferred pH range @ 25° C. |
|---|---|
| Hydrochloric acid/Potassium chloride | 1.0-2.2 |
| Glycine/Hydrochloric acid | 2.2-3.6 |
| Potassium hydrogen phthalate/Hydrochloric acid | 2.2-4.0 |
| Citric acid/Sodium citrate | 3.0-6.2 |
| Sodium acetate/Acetic acid | 3.7-5.6 |
| Potassium hydrogen phthalate/Sodium hydroxide | 4.1-5.9 |
| Disodium hydrogen phthalate/Sodium dihydrogen orthophosphate | 5.8-8.0 |
| Dipotassium hydrogen phthalate/Potassium dihydrogen orthophosphate | 5.8-8.0 |
| Potassium dihydrogen orthophosphate/sodium hydroxide | 5.8-8.00 |
| Barbitone sodium/Hydrochloric acid | 6.8-9.6 |
| Tris (hydroxylmethyl) aminomethane/Hydrochloric acid | 7.0-9.00 |
| Sodium tetraborate/Hydrochloric acid | 8.1-9.2 |
| Glycine/Sodium hydroxide | 8.6-10.6 |
| Sodium carbonate/Sodium hydrogen carbonate | 9.2-10.8 |
| Sodium tetraborate/Sodium hydroxide | 9.3-10.7 |
| Sodium bicarbonate/Sodium hydroxide | 9.60-11.0 |
| Sodium hydrogen orthophosphate/Sodium hydroxide | 11.0-11.9 |
| Potassium chloride/Sodium hydroxide | 12.0-13.0 |

DETAILED DESCRIPTION

We provide methods of preparing metallic catalysts and selectively hydrogenating hydrogenatable precursors thereby improving the yield and activity. We discovered that when a metallic catalyst is subjected to, for example, a one hour pre-hydrogenation process in phosphate buffer instead of the conventional pre-hydrogenation treatment in DI water, the catalyst shows surprisingly increased selectivity towards BDO in the hydrogenation of succinic acid in aqueous phase.

The BDO-selective catalysts are prepared by treating a catalyst precursor or a finished catalyst with a "modifier solution." A modifier solution may be a pH buffer or a compound solution (i.e., a solution of inorganic or organic salts, phosphates, or acetates, etc.). In preferred examples, the modifier solution is a phosphate buffer solution.

Where the modifier solution is a buffer solution, it may be prepared according to known methods for preparing buffer solutions such as by preparing an aqueous solution comprising of a mixture of a weak acid and its conjugate base or a weak base and its conjugate acid. The modifier solution may be prepared and added to the reaction mixture as an aqueous solution or the active components of the modifier solution may be added to the reaction mixture to form the modifier solution in-situ.

The modifier solution treatment can be applied at any stage of catalyst preparation. For example, precursor catalysts can be treated with the modifier solution prior to reduction of the metals comprising the catalyst. Alternatively, reduced or finished catalysts can be treated with the modifier solution after reduction of the metals or during reduction of the metals with hydrogen or a hydrogen source. The catalyst may also be reactivated after a period of use by treating the used catalyst with additional amounts of the modifier solution.

Suitable modifier solutions can comprise, but are not limited to, the solutions disclosed in Table 1. Additionally, modifier solutions may further comprise other non-limiting compounds, such as, but not limited to, NaOH, phosphates, acetates, borates and the like.

In some examples, the pH range of modifier solution is about 3 to about 11. In some preferred examples, the pH is about 5 to 10, or more preferably, about 5 to about 8. One of ordinary skill in the art can select the appropriate pH and modifier solution composition to optimize the desired hydrogenation reactions.

The modifier solution may be used to treat catalyst precursors, reduced catalysts, previously used catalysts and/or reduced and passivated catalysts to improve selectivity. A catalyst precursor may be obtained by a number of known methods such as, but not limited to, the insipient wetness method and the like. A catalyst precursor typically contains metals in an oxidized state. Reduction of the precursor catalyst can be performed either in-situ or ex-situ. In other words, the precursor catalyst can be reduced while in the hydrogenation reaction vessel, or prior to being added to the reaction vessel. In contrast, a reduced (or finished), catalyst is a catalyst precursor that has been reduced by a reducing agent such as, but not limited to, hydrogen, formaldehyde, borohydride and the like.

For in-situ reduction, the catalyst may be combined with a modifier solution in a reaction vessel. Air in the vessel may be replaced by argon or other inert gas by pressurize-release cycles followed by hydrogen (200 psi) cycles. The temperature in the reactor may be raised to about 150 to about 300 such as 150, 175, 200, 225, 250, 275 or 300° C., over the course of 10, 20, or 30 minutes or more. The pressure may be adjusted to about 500 to about 3000 psi, preferably about 1500 psi to about 2000 psi, and the suspension may be stirred at these settings for up to two, three or four hours or any time there between or longer. The reactor may then be cooled to ambient temperature, the pressure may be released and the liquid phase siphoned out through a fritted port. A subsequent hydrogenation reaction may be started by injecting a feed solution of succinic acid or another dicarboxylic acid or a combination thereof through the side port under argon or other inert gas using a gas tight syringe or other appropriate means.

For ex-situ reduction, catalyst precursor may be transferred into a reaction vessel and reduced ex-situ in flowing hydrogen with an appropriate temperature programmed routine. For example, the vessel may be purged with argon or other inert gas for an appropriate time and flow rate to displace any air and the flow then switched to hydrogen or hydrogen containing gas mixture and the temperature gradually increased from room temperature to an elevated temperature. For example, the temperature in the vessel may be increased to about 250 to about 400° C., such as 225, 250, 275, 300, 325, 375 or 400° C., preferably at ramp rate of 1.17° C./min, and then held at the elevated temperature for about 5 to about 11 hours, preferably about 8 hours. After the elevated temperature isotherm, the gas flow may be switched back to Argon or other inert gas and the catalyst temperature reduced to ambient. The catalyst can then be transferred into a sealed vial and stored until further use. When needed, the ex-situ reduced catalyst (i.e., finished catalyst) may be pre-activated by a treatment with a modifier solution.

Reduced catalysts can be pre-activated according to methods disclosed herein. Pre-activation is typically done in a reactor with hydrogen or a hydrogen precursor to prepare the catalyst for the hydrogenation reaction. Reduced catalysts can also be passivated. A passivated catalyst is a finished or reduced catalyst that has been passivated with small amounts of passivating agent, such as air and/or carbon dioxide.

Many hydrogenation catalysts are effective including (without limitation) those containing at least one selected from iridium, palladium, rhodium, nickel, cobalt ruthenium, platinum, rhenium, compounds thereof, combinations thereof, and the supported versions thereof. In addition, the catalyst may contain an effective amount of two, three or more metals. The hydrogenation catalyst may have both ruthenium and rhenium in a reduced state, such as the Ru,Re/C catalyst disclosed in U.S. Pat. No. 5,478,952 or the Ru,Re,Sn catalysts disclosed in U.S. Pat. No. 6,008,384, both herein incorporated by reference in their entireties. A preferred catalyst composition comprises Ru, such as 2% Ru+6% Re+0.9% Sn, and may be supported on carbon.

Optionally, a suitable promoter may be used with the catalytic metal in the method of this disclosure. Suitable metal promoters include: 1) those elements from groups I and II of the periodic table; 2) tin, copper, gold, silver, and combinations thereof; and 3) combinations of group 8 metals of the periodic table in lesser amounts. Suitable promoters include Bi, Ag, Au, Sn, Ga, Sb, Pb, Cd, In, Te, P among others. The term "promoter" is a compound added to enhance the physical or chemical function of a catalyst. A chemical promoter generally augments the activity or selectivity of a catalyst and may be either incorporated into the catalyst during any step in the chemical processing of the catalyst composition or it can be added into the reactant feed during reaction. The chemical promoter generally enhances the physical or chemical function of the catalyst agent, but can also be added to retard undesirable side reactions. A "metal promoter" refers to a metal or metallic compound added to enhance the physical or chemical function of a catalyst. Preferred promoters are Re and Sn.

In some examples, the catalyst is supported. The catalyst support can be any solid, inert substance including, but not limited to, single or mixed oxides such as silica, alumina, titania, niobia, zirconia, lanthanum, cerium, and also calcium carbonate, barium sulfate, and carbons. The catalyst support can be in the form of powder, granules, pellets or the like. A preferred support material may be selected from the group consisting of carbon, alumina, silica, silica-alumina, titania, titania-alumina, titania-silica, zirconia, barium, calcium, compounds thereof and combinations thereof. Suitable supports also include, but are not limited to, carbon, $SiO_2$, $CaCO_3$, $BaSO_4$ and $Al_2O_3$. Moreover, supported catalytic metals may have the same supporting material or different supporting materials. The support may be treated with a modifier solution prior to or during metal deposition.

In one example, a preferred support is carbon. Further preferred supports may be those, particularly carbon, that have a surface area greater than about 100 to about 200 $m^2/g$. Further preferred supports may be those, particularly carbon, that have a surface area of at least about 300 $m^2/g$.

Examples of suitable commercially available support carbons include those sold under the following trademarks: Barneby & Sutcliffe™, Darco™, Nuchar™, Columbia JXN™, Columbia LCK™, Calgon PCB™, Calgon BPL™, Nuchar®, Donau® Japan Envirochem®, Jacobi®, Kansai®, SBC® Westvaco™, Norit™, Ceca®, PACCO® and Barnaby Cheny NB™. The carbon can also be commercially available carbon such as Calsicat C, Sibunit C, or Calgon C (commercially available under the registered trademark Centaur®) and related materials. The carbon support may be an activated carbon made by any conventional activation process or a partly graphitic carbon or substantially graphitic carbon or a carbon black.

Carbon supports may be used as is or treated with an oxidizing agent which is used to functionalize the surface or to remove impurities, Non-limiting examples of oxidation reagents are nitric acid, hydrogen peroxide, Oxone®, perborates or per-carbonates, peracids such as peracetic acid, alkyl or aryl peroxides such as t-butyl hydrogen peroxide and hypochlorite. Most preferred is nitric acid. The oxidant may be used in a concentrated or diluted form to modify the treatment.

While the weight percent of catalyst on the support is not critical, it will be appreciated that the rate of the reaction is proportional to the weight percent of metal. The content range of one or more metals in a supported catalyst may be about 0.1 wt % to about 20 wt % of the whole of the supported catalyst (catalyst metals weight plus the support weight). A more preferred catalytic metal content range is about 1 wt % to about 15 wt % by weight of the whole of the supported catalyst. A further preferred catalytic metal content range is about 4 wt % to about 10 wt % by weight of the whole of the supported catalyst.

In some examples, the carbon supports may be used as extrudate or may be a crushed and sieved form of the extrudate. Extrudates having diameters within the range of to about 0.2 mm to about 2 mm, but not limited to, that range may be used. For example, extrudates may be R1 Extra and ROW 0.8 carbon supports having diameters of about 1 mm and about 0.8 mm, respectively.

If desired, for example, if the size of a reactor is too small to accommodate the whole extrudate, it may be crushed and sieved through a screen to collect the desired particle size. The screen collecting may have a size of 40 to 60 mesh, but the size of the screen may be more or less.

Catalysts treated with the modifier solution can be used to hydrogenate a number of hydrogenatable precursors. Hydrogenatable precursor can be, in the broadest sense, any compound or material that can be chemically reduced by hydrogenation or hydrogen up-take. Preferred hydrogenatable precursors include, but are not limited to, dicarboxylic acids, ketoacids, and monobasic acids. Monobasic acids can be hydrogenated to a mono-alcohol, which may then be further converted to an ether. An example is the hydrogenation of acetic acid to ethanol which also produces significant amounts of di-ethylether.

Preferred dicarboxylic acids include those that are $C_2$-$C_{12}$, more preferably oxalic, itaconic, maleic, succinic, fumaric, malic, methylmalonic, glucaric, methylsuccinic, adipic, methylglucaric, pimelic, suberic, terephthalic, ortho and meta phthalic acids. The most preferred hydrogenatable dicarboxylic acids based on the commercial value of the hydrogenated product are maleic, fumaric, succinic, and adipic acid. Preferred ketoacids include $C_4$-$C_{12}$ ketoacids such as, but not limited to, 4-oxobutanoic acid, levulinic acid, oxocaproic acid, 9-oxonanoic. Preferred monobasic acids include, but are not limited to, acetic, propionic, butyric, pentanoic, caproic, heptanoic, octanoic, nonanoic, decanoic, dodecanoic, stearic, and icosanoic acids.

Once treated with the modified solution, catalysts may be used in hydrogenation reactions according to known methods and the hydrogenated product may be recovered. The hydrogenation process may be carried out in the gas or liquid phase, in batch, sequential batch (i.e., a series of batch reactors) or in continuous mode in any of the equipment customarily employed for continuous processes (see, for example, H. S. Fogler, *Elementary Chemical Reaction Engineering*, Prentice-Hall, Inc., NJ, USA). The source of hydrogen used for the hydrogenation can include, but is not limited to, gaseous $H_2$ or a transfer hydrogenation compound such as isopropanol, decalin and cyclohexane.

The temperature, solvent, catalyst, pressure and mixing rate are all parameters that affect the hydrogenation reaction. The relationships among these parameters may be adjusted by one skilled in the art to achieve the desired conversion, reaction rate and selectivity in the reaction of the process.

Solvents may be used in the hydrogenation reaction. Suitable solvents include alcohols (which may be a product of the hydrogenation process), water and ethers.

Any US Patents or Patent Application Publications or other documents cited herein are incorporated by reference in their entirety.

It should also be noted that the above description is not intended to limit the scope of our catalysts, processes and hydrogenatable substrates and methods other than as described in the appended claims.

EXAMPLES

The following examples are representative of the methods of this disclosure. The examples that use a modifier solution use a phosphate pH 7.0 buffer solution from Ricca Chemical Company (CAT No: 1550-16). The catalyst studied in the examples is a carbon supported 2% Ru/6% Re/0.9% Sn catalyst.

Example 1

Oxidation of the Carbon Support

Oxidation of the carbon support was done in several methods that included the use of concentrated nitric acid, diluted nitric acid or 10-30% hydrogen peroxide. The oxidation was done over a range of temperatures from 0-90° C.

Example 2

Example of Preparation of Oxidized Carbon Support

The oxidation of Norit RO 0.8 carbon was carried out by charging slowly 10 g of Norit ROW 0.8 Supra carbon at room temperature into the three-neck round bottom flask containing 100 cc of a 25% $HNO_3$ solution. After complete addition of the carbon, the temperature was raised to 75°-80° C. and kept overnight. The suspension was then cooled to room temperature and the oxidized carbon was washed with deionized water until the pH equaled 7. Finally, the carbon was dried overnight in a vacuum oven at 120° C.

Example 3

Preparation of the Catalyst Precursor (2Ru-6Re-0.9Sn)/Oxidized Norit Carbon ROW 0.8

Norit ROW 08 carbon was oxidized as per the procedure described in Example 2. An aqueous solution (8 mL) of $RuCl_3.H_2O$ (0.223 g), $HReO_4$ (0.577 g of the stock solution of 52% Re) and 5 $nCl_4.(H_2O)_5$ (0.133 g) was added slowly under stirring to a beaker, containing 5 g of oxidized Norit RO 08 extruded carbon. The completely wetted support was stirred occasionally for the next two hours and the beaker transferred into a vacuum oven. The oven is evacuated to 22" Hg and the temperature was slowly raised to 110° C. and held at that setting overnight. The oven temperature was next reduced to ambient and the catalyst precursor transferred into a sealed vial and kept in a desiccator until used in the subsequent reduction.

Example 4

4.1. Catalyst Precursor Reduction with Gaseous Hydrogen:

The catalyst precursor (5.00 g) was loaded in a ⅜" Pyrex tube and purged with Ar at room temperature for 30 min at flow rate of 40 cc/min. The purge flow was next switched to hydrogen (40 cc/min), the temperature was ramped to 300° C. over 4 hours (1.17°/min) and held at that setting for additional 8 hours. After this time period, the flow was again switched back to Ar and the temperature reduced to ambient. The catalyst is transferred in screw cap glass vials and stored at ambient conditions until use.

4.2. Catalyst Precursor Reduction in Liquid Phase—Standard Procedure.

The catalyst precursor (1.00 g) and DI water (40 mL) are charged in the Autoclave Engineers reactor, the air replaced by five purge cycles of argon followed by five flush cycles of hydrogen. The reactor is pressurized to 1000 psi, the temperature raised to 250° C. and after adjustment of the pressure to 1500 psi, the catalyst is reduced under these condition for 3 hour. The reactor is cooled to ambient temperature, the aqueous phase drained off. The subsequent hydrogenation reaction is started by injecting the feed solution of SA through the side port under argon using a gas tight syringes.

4.3. New Catalyst Precursor Reduction Procedure in Liquid Phase

The catalyst was prepared by the same procedure as described in 4.2, but instead of DI water, the reactor is charged with 40 mL modifier solution. The modifier solution in this case was A phosphate buffer pH 7.0 from Ricca Chemical Company (CAT No. 1550-16)

4.4. Standard Pre-Activation Procedure for Catalyst Reduced with Gaseous Hydrogen (See 4.1).

In this example, the reactor flask is charged with 1.0 g of the particulate "finished" catalyst and 40 cc DI water. For this pre-activation procedure, the catalyst is already reduced with gaseous hydrogen as described in 4.1. When the catalyst is used in the particulate form, the same is loaded in a specially designed double mesh basket assembly. In the experiments with powdered catalyst, the same is charged directly in the reactor without the basket attachment. The system was alternately purged with nitrogen (by five pressurize-release cycles) followed by five cycles with hydrogen to 200 psi. The temperature was increased to 200° C. and a stirring speed of 250 rpm which takes an average of 20-25 min. When the temperature stabilized at this setting, the pressure in the reactor was adjusted to 1500 psi, the stirring set to 1200 RPM and the catalyst is pre-hydrogenated for 1 h at the specified conditions.

4.5. New Pre-Activation Procedure for Catalyst Reduced with Gaseous Hydrogen (See 4.1).

4.6. The catalyst was Prepared by the Same Procedure as 4.4, but Instead of DI Water, The Reactor was Charged with 40 mL Modifier Solution. The Modifier Solution in this Case Was Phosphate Buffer pH 7.0 from Ricca Chemical Company (CAT No: 1550-16).

After the pre-activation step, the reactor was cooled to ambient temperature, and the aqueous phase drained off. The catalyst, made by this pre-activation protocol was used in subsequent hydrogenation reactions, started by injecting the feed solution of succinic acid through the side port under argon using a gas tight syringes. The heating and start of the data acquisition was the same as in example 4.4.

Hydrogenation Examples 5-25

The following specific examples show the distinct advantages of the buffer (or modifier solution) reduced precursor catalysts or buffer (or modifier) pre-activated finished catalysts. They outline the unexpected improvements in selectivity and activity for catalysts treated with a modifier solution compared to standard treatment with DI water. The catalyst in all examples was 2% Ru+6% Re+0.9% Sn supported on high surface area carbons such as ROW 0.8 Supra and R1 Extra. Results for each of the hydrogenation examples, including the percent succinic acid conversion and selectivity for BDO, THF or GBL, are shown in Table 2.

Examples 5-8

Prior work according to conventional methods has shown that if a particulate catalyst is ground into powdered form, the BDO selectivity is drastically deteriorated compared to non-powdered catalyst. However, Examples 5-8 show that pre-treatment with a phosphate buffer modifier solution restores and even markedly improves BDO selectivity of powdered catalysts.

Examples 5 to 8 were performed on a finished catalyst prepared using oxidized ROW08-Supra carbon as catalyst support. Examples 5 and 6 were performed on an extrudate of a finished catalyst while Examples 7 and 8 were performed on the crushed and sieved form of the catalyst. The catalysts were reduced with 4% hydrogen prior to pre-activation with hydrogen in DI water (Example 5 and 7) or in modifier solution (Examples 6 and 8). The catalyst pre-activation was done at 200° C. and 1500 psi hydrogen pressure over one hour activation time.

Figure 1A:
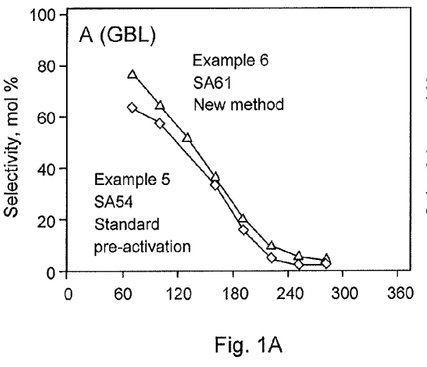
FIG. 1A shows a graph comparing the selectivity of finished catalysts treated with modifier solution (marked with triangles) compared to catalysts treated with DI water (marked with diamonds) for converting succinic acid to GBL.
Figure 1B:
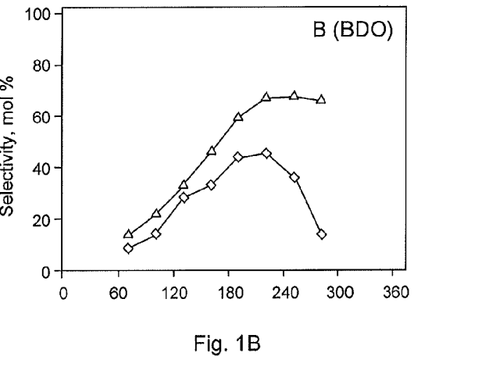
FIG. 1B shows a graph comparing the selectivity of the catalyst of FIG. 1A treated with modifier solution (marked with triangles) compared to treatment with DI water (marked with diamonds) for converting succinic acid to BDO.
Figure 1C:
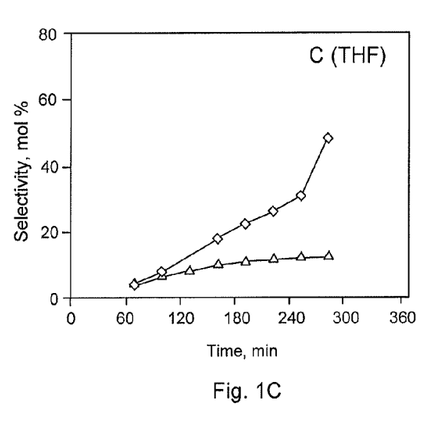
FIG. 1C shows a graph comparing the selectivity of the catalyst of FIG. 1A treated with modifier solution (marked with triangles) compared to treatment with DI water (marked with diamonds) for converting succinic acid to THF.
Figure 1D:
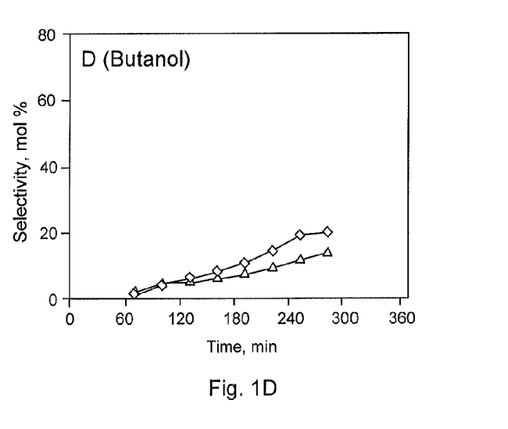
FIG. 1D shows a graph comparing the selectivity of the catalyst of FIG. 1A treated with modifier solution (marked with triangles) compared to treatment with DI water (marked with diamonds) for converting succinic acid to butanol.
Figure 2A:
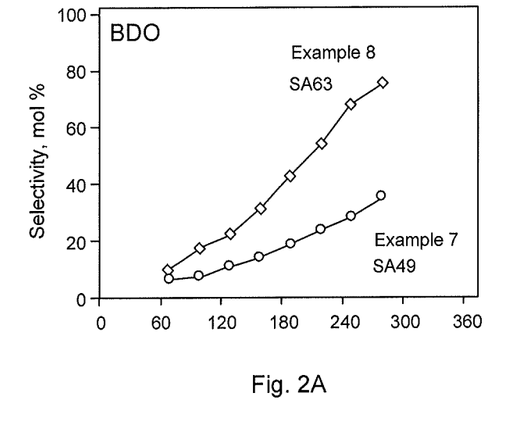
FIG. 2A shows a graph comparing the selectivity for converting succinic acid to BDO of a crushed and sieved form of a finished catalyst treated with modifier solution (marked with diamonds) or DI water (marked with circles).
Figure 2B:
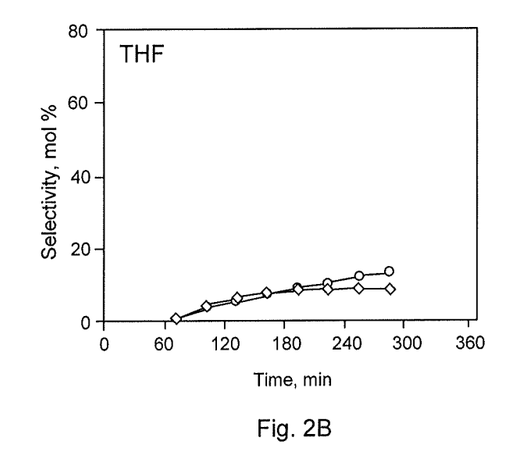
FIG. 2B shows a graph comparing the selectivity for converting succinic acid to THF of the catalyst of FIG. 2A treated with modifier solution (marked with diamonds) or DI water (marked with circles).

The specific Examples 5 to 8 demonstrate the significant improvement in the BDO selectivity when the catalyst is pre-activated in modifier solution (Example 6 vs. Example 5). FIGS. 1A-1D show the selectivity of the catalyst prepared in Example 6 (triangles) to Example 5 (diamonds) for making BDO from succinic acid. Also, as shown in FIGS. 2A and 2B, the comparison of Example 8 (diamonds) vs. Example 7 (circles) shows the significant improvement in both the catalyst activity and selectivity towards BDO when modifier solution is used as pre-activating solution. The powdered catalyst, after treatment in a phosphate buffer modifier solution, can achieve high BDO selectivity.

Examples 9-12

Previous work according to conventional methods has indicated that gas phase reduction of the catalyst precursor is essential for stable catalyst performance. Prior attempts to achieve an in-situ reduction of the catalyst precursor in DI water failed to produce an active catalyst. However, Examples 9-12 demonstrate that treatment with a phosphate buffer modifier solution provides for in-situ reduction of the catalyst with high BDO selectivity.

Examples 9 to 12 were carried out with catalyst precursor, prepared using oxidized ROW 08-Supra carbon, and the precursor was reduced in-situ in either DI water (Example 9 and 11) or with buffer modifier solution (Example 10 and 12). Examples 9-10 were performed on the extruded form of the catalyst while Examples 11-12 were performed on the crushed and sieved form of the catalyst. In these Examples, the in-situ reduction of the catalyst precursor was done at 250° C. and 2000 psi hydrogen pressure over three hours reduction time.

Figure 3A:
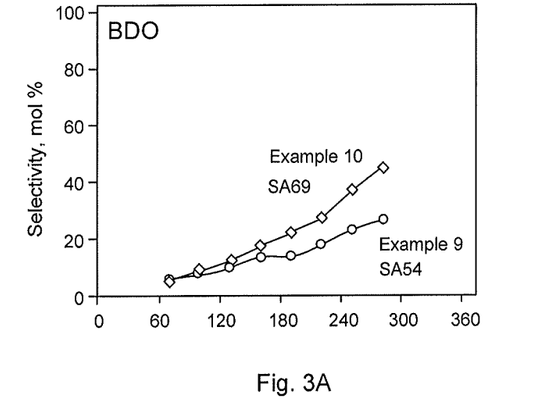
FIG. 3A shows a graph of the selectivity for converting succinic acid to BDO of granular form of a catalyst precursor prepared using oxidized ROW 0.8-Supra carbon and reduced in-situ in modifier solution (marked with diamonds) or DI water (marked with circles).
Figure 3B:
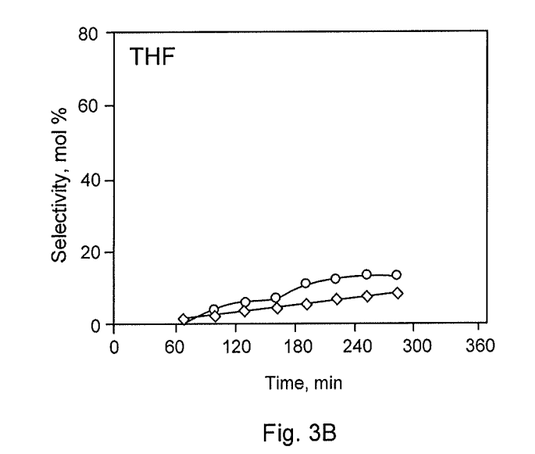
FIG. 3B shows a graph of the selectivity for converting succinic acid to THF of the catalyst of FIG. 3A reduced in-situ in modifier solution (marked with diamonds) or DI water (marked with circles).

FIGS. 3A and 3B show the high selectivity of the catalyst prepared in Example 10 (diamonds) for BDO compared to THF.

Figure 4A:
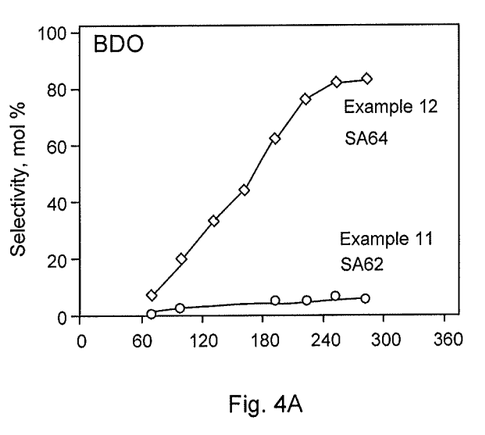
FIG. 4A shows a graph comparing the selectivity for converting succinic acid to BDO and THF of a crushed and sieved form of a catalyst precursor prepared using oxidized ROW 0.8-Supra carbon and reduced in-situ in modifier solution (marked with diamonds) or DI water (marked with circles).
Figure 4B:
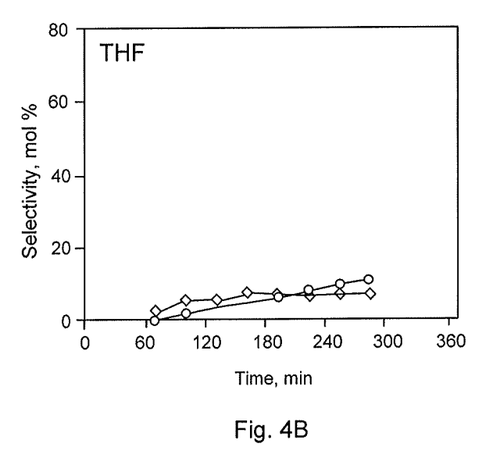
FIG. 4B shows a graph comparing the selectivity for converting succinic acid to THF of the catalyst of FIG. 4A reduced in-situ in modifier solution (marked with diamonds) or DI water (marked with circles).

Examples 11-12 (FIGS. 4A and 4B, Example 11 marked with circles and Example 12 marked with diamonds) show dramatic improvement in the catalyst activity and selectivity to BDO for the buffer modifier solution reduced crushed and sieved form of the catalyst. While the standard reduction of the precursor in DI water produced a catalyst of low activity, with the predominant product being GBL, the modifier solution treated catalyst generated BDO at high selectivity with very low levels of propanol, butanol and THF as common by-products.

Examples 13-16

Prior work according to conventional methods has shown that oxidative treatment of the carbon support with $HNO_3$ is essential in obtaining good selectivity. However, Examples 13-16 show that treatment with phosphate buffer modifier solution, rather than DI water, results in a surface modification that improves the performance of the catalysts made on non-oxidized supports.

Examples 13-16 were performed on a finished catalyst prepared using non-oxidized R1 Extra carbon support material. The catalysts were reduced with 4% hydrogen prior to pre-activation with hydrogen in DI water (Example 13 and 15) or in modifier solution (Examples 14 and 16). Examples 13 and 14 were performed on an extruded form of the catalyst while in Examples 15 and 16, the catalyst was used in after crushing- and sieving to 40-60 mesh. The catalyst pre-activation was done at 200° C., at 1500 psi hydrogen pressure over one hour activation time.

Figure 5A:
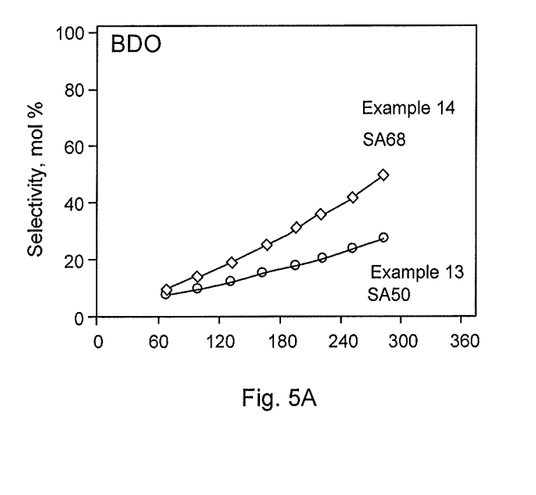
FIG. 5A shows a graph comparing the selectivity for converting succinic acid to BDO of a crushed and sieved form of a finished catalyst prepared using a non-oxidized R1 Extra carbon support material and pre-activated with modifier solution (marked with diamonds) or with standard DI water pre-activation (marked with circles).
Figure 5B:
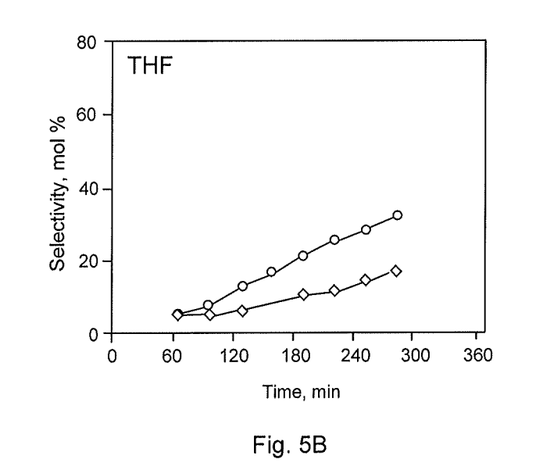
FIG. 5B shows a graph comparing the selectivity for converting succinic acid to THF of the catalyst of FIG. 5A pre-activated with modifier solution (marked with diamonds) or with standard DI water pre-activation (marked with circles).

As shown in FIGS. 5A and 5B, the direct comparison of the results from the modifier solution pre-activated finished catalyst (Example 14, marked with diamonds) with the standard DI pre-activation (Example 13, marked with circles) shows complete reversal in the BDO vs. THF selectivity. THF is the dominant end product with the DI pre-activated catalyst, whereas BDO is preferentially formed with the modifier solution pre-activated catalyst.

Figure 6A:
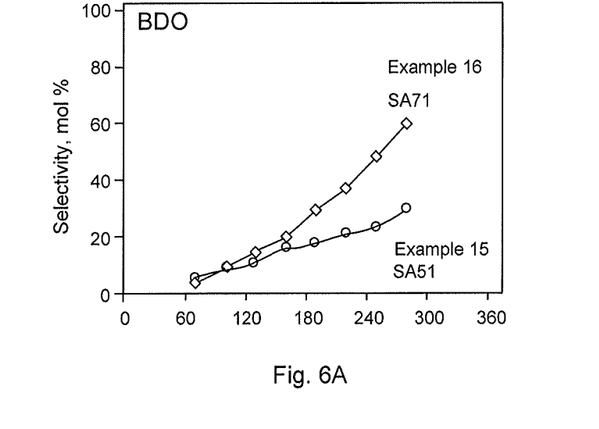
FIG. 6A shows a graph of the selectivity for converting succinic acid to BDO of a crushed and sieved form of a finished catalyst prepared using non-oxidized R1 Extra carbon support material reduced with 4% hydrogen prior to pre-activation with hydrogen in DI water (marked with circles) or with modifier solution (marked with diamonds).
Figure 6B:
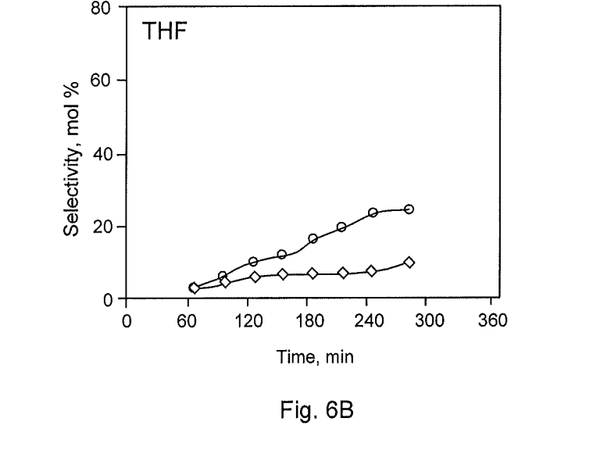
FIG. 6B shows a graph of the selectivity for converting succinic acid to THF of the catalyst of FIG. 6A prior to pre-activation with hydrogen in DI water (marked with circles) or with modifier solution (marked with diamonds).

FIGS. 6A and 6B show the selectivity of the catalyst prepared in Example 15.

Examples 17-20 were performed on a catalyst precursor prepared using non-oxidized R1 Extra carbon support.

Figure 7A:
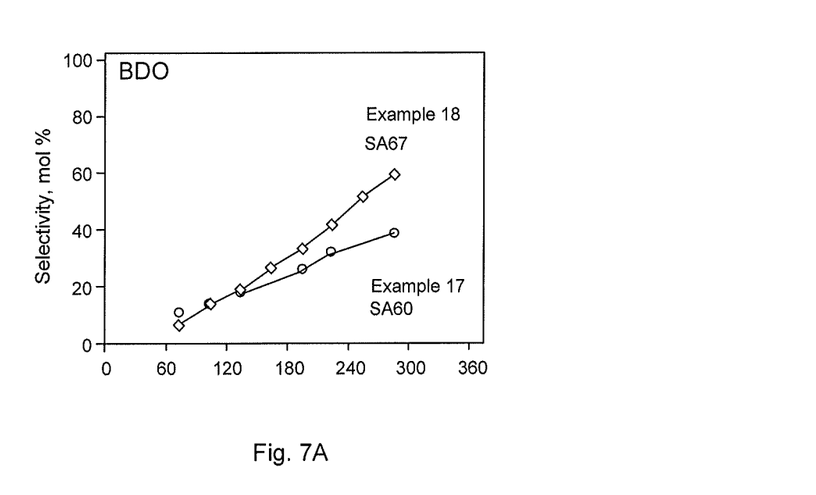
FIG. 7A shows a graph of the selectivity for converting succinic acid to BDO a particulate form of a catalyst precursor prepared using non-oxidized R1 Extra carbon support treated with modifier solution (marked with diamonds) or DI water (marked with circles).
Figure 7B:
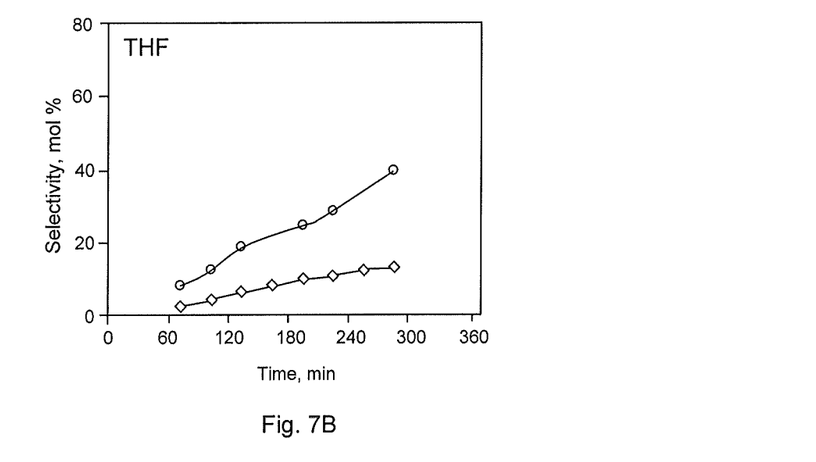
FIG. 7B shows a graph of the selectivity for converting succinic acid to THF the catalyst of FIG. 7A treated with modifier solution (marked with diamonds) or DI water (marked with circles).

FIGS. 7A and 7B show the selectivity of the catalyst prepared in Example 18.

Figure 8A:
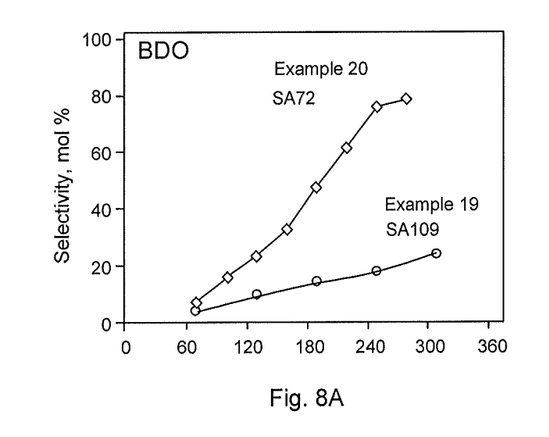
FIG. 8A shows a graph of the selectivity for converting succinic acid to BDO of crushed and sieved form of a catalyst precursor prepared using non-oxidized R1 Extra carbon support treated with modifier solution (marked with diamonds) or DI water (marked with circles).
Figure 8B:
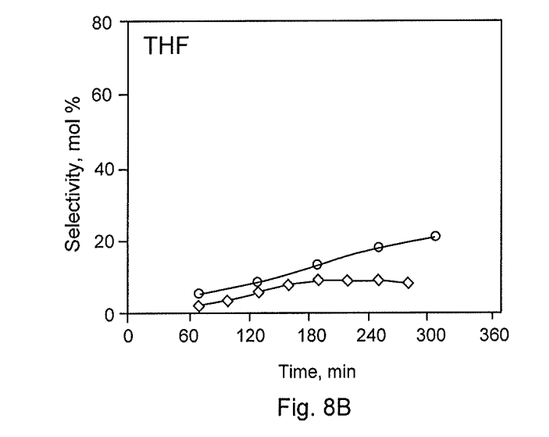
FIG. 8B shows a graph of the selectivity for converting succinic acid to THF the catalyst of FIG. 8A treated with modifier solution (marked with diamonds) or DI water (marked with circles).

FIGS. 8A and 8B show the selectivity of catalyst prepared in Examples 19 and 20.

TABLE 2a

Catalysts based on oxidized ROW 08 Supra carbon.
Conditions: T 200 C., P 1500 psi, Stir rate 1200, Aq. SA solution = 40 cc
(0.0942 g/mL, 0.797 mmol/mL), Cat 1.0 g, Reaction time 220/270 min

| Exp) 1 | Catalysts # 2 | Carbon Type 3 | Carbon Oxidation 4 | Cat redn % H2 5 | Run 6 | Time (min) 7 | Cnv (%) 8 | Selectivity (% mol) NPr 9 | THF 10 | NBA 11 | GBL 12 | BDO 13 | Treatment 14 |
|---|---|---|---|---|---|---|---|---|---|---|---|---|---|
| | 1. Samples made with oxidized ROW 08 Supra carbon-H2 reduced-finished catalysts. Catalyst used in particulate (Example 5-6) or after crushing (Example 7-8) |||||||||||||
| 5 | Ev-CRH Supra (Finished) | ROW Supra | 25% HNO₃ | 4% | SA45 | 220 | 100.0 | 9.3 | 26.0 | 13.9 | 5.6 | 45.2 | Standard treatment |
| 6 | Ev-CRH Supra (Finished) | ROW Supra | 25% HNO₃ | 4% | SA61 | 280 | 100 | 4.0 | 12.0 | 11.0 | 5.9 | 67.1 | Pre-activation buffer pH-7 |
| 7 | #5-crushed sieved | ROW Supra | 25% HNO₃ | 4% | SA49 | 280 | 92.0 | 1.2 | 12.4 | 3.2 | 47.6 | 35.2 | Standard treatment |
| 8 | #5-crushed sieved | ROW Supra | 25% HNO₃ | 4% | SA63 | 280 | 99.9 | 1.5 | 7.9 | 5.2 | 10.1 | 75.3 | Pre-activation buffer pH-7 |
| | 2. Samples made with oxidized ROW 08 Supra carbon-in situ reduced precursor catalyst. Catalyst used in particulate (Example 9-10) or after crushing (Example 11-12) |||||||||||||
| 9 | Ev-CRH Supra (Precursor) | ROW Supra | 25% HNO₃ | None | SA54 | 280 | 100.0 | 5.9 | 31.2 | 15.2 | 2.0 | 45.8 | In situ reduction water |
| 10 | Ev-CRH Supra (Precursor) | ROW Supra | 25% HNO₃ | None | SA69 | 280 | 98.8 | 2.2 | 7.7 | 4.6 | 40.1 | 44.8 | In-situ reduction buffer pH-7 |
| 11 | #9-crushed sieved | ROW Supra | 25% HNO₃ | None | SA62 | 280 | 32.1 | 0.0 | 10.5 | 0.0 | 84.6 | 4.9 | In situ reduction water |
| 12 | #9-crushed sieved | ROW Supra | 25% HNO₃ | None | SA64 | 280 | 100.0 | 2.7 | 6.8 | 5.6 | 4.1 | 80.9 | In-situ reduction buffer pH-7 |

TABLE 2b

Catalysts based on none-oxidized R1 Extra carbon
Conditions: T 200 C., P 1500 psi, Stir rate 1200, Aq. SA solution = 40 cc (0.0942 g/mL, 0.797 mmol/mL),
Cat 1.0 g, Reaction time 220/270 min

| Example 1 | Catalysts # 2 | Carbon Type 3 | Carbon Oxidation 4 | Cat redn % H2 5 | Run 6 | Time (min) 7 | Cnv (%) 8 | Selectivity (% mol) NPr 9 | THF 10 | NBA 11 | GBL 12 | BDO 13 | Treatment 14 |
|---|---|---|---|---|---|---|---|---|---|---|---|---|---|
| | 3. Samples made with non-oxidized R1 Extra carbon-H2 reduced-finished catalysts. Catalyst used in particulate (Example 13-14 or after crushing (Example 15-16) |||||||||||||
| 13 | Ev-CRF R1 Extra (Finished) | R1 Extra | None AcTrd | 4% | SA50 | 280 | 90.2 | 0.4 | 32.1 | 3.0 | 37.3 | 27.2 | Standard treatment |
| 14 | Ev-CRF R1 Extra (Finished) | R1 Extra | None AcTrd | 4% | SA68 | 280 | 96.9 | 0.7 | 17.2 | 4.3 | 28.2 | 49.3 | Pre-activation buffer pH-7 |
| 15 | #13-crushed sieved | R1 Extra | None AcTrd | 4% | SA51 | 280 | 77.7 | 0.0 | 19.2 | 1.5 | 48.2 | 30.7 | Standard treatment |
| 16 | #13-crushed sieved | R1 Extra* | None AcTrd | 4% | SA71 | 280 | 99.5 | 2.1 | 6.7 | 5.6 | 25.5 | 60.1 | Pre-activation buffer pH-7 |
| | 4. Samples made with non-oxidized R1 Extra carbon-in situ reduced precursor catalyst. Catalyst used in particulate (Example 17-18) or after crushing (Example 19-20) |||||||||||||
| 17 | Ev-CRF R1 Extra Precursor | R1 Extra | None AcTrd | None | SA60 | 280 | 99.7 | 6.3 | 39.3 | 6.3 | 11.0 | 39.8 | In situ reduction water |
| 18 | Ev-CRF R1 Extra Precursor | R1 Extra | None AcTrd | None | SA67 | 280 | 100.0 | 4.4 | 12.6 | 5.1 | 17.3 | 60.3 | In-situ reduction buffer pH-7 |
| 19 | #17-crushed sieved | R1 Extra | None AcTrd | None | SA109 | 310 | 90.0 | 7.8 | 21.0 | 6.4 | 35.3 | 26.6 | In situ reduction water |
| 20 | #17-crushed sieved | R1 Extra | None AcTrd | None | SA72 | 280 | 99.9 | 0.9 | 8.2 | 4.3 | 5.2 | 81.3 | In-situ reduction buffer pH-7 |

*Sample of Example 16 was prepared by oxidized R1 Extra carbon support.

TABLE 2c

Catalysts made by in-situ reduction of precursor catalyst based on none oxidized R1 Extra carbon (1JR13)

Conditions: T 200 C., P 1500 psi, Stir rate 1200, Aq. SA solution = 40 cc (0.0942 g/mL, 0.797 mmol/mL), Cat 1.0 g, Reaction time 220/270 min

| Example | Modifier used in the catalyst reduction step # | Carbon Type | Oxidation | % H2 | Run | Time (min) | Cnv (%) | Selectivity (% mol) NPr | THF | NBA | GBL | BDO |
|---|---|---|---|---|---|---|---|---|---|---|---|---|
| 5. Samples made with non-oxidized R1 Extra carbon-in situ reduced precursor catalyst. Catalyst used in particulate form (Example 21-26) | | | | | | | | | | | | |
| 21 | No modifier | R1 Extra | None AcTrd | | SA109 | 310 | 90.0 | 7.8 | 21.0 | 6.4 | 35.3 | 26.6 |
| 22 | 1 wt % Na$_2$HPO$_4$ | R1 Extra | None AcTrd | | SA116 | 310 | 99.4 | 5.1 | 7.1 | 4.8 | 6.7 | 76.2 |
| 23 | 1 wt % KH$_2$PO$_4$ | R1 Extra | None AcTrd | | SA117 | 310 | 96.9 | 6.3 | 16.8 | 4.9 | 28.1 | 43.1 |
| 24 | 1 wt % NaOH | R1 Extra | None AcTrd | | SA118 | 310 | 99.1 | 2.0 | 6.5 | 2.7 | 8.5 | 80.1 |
| 25 | 1 wt % Na$_2$B$_4$O$_7$ | R1 Extra | None AcTrd | | SA119 | 310 | 98.3 | 2.2 | 7.0 | 2.7 | 16.2 | 72.0 |

Examples 26 to 37 show the benefits of buffer addition during a continuous fixed bed run. For these examples, the catalyst volume was 12 grams, H$_2$/SA molar ratio=40, GHSV=83 nL/kg cat/hr, LHSV=8.3 nL/kgcat/hr. A reaction feed solution was prepared with 9 grams Na$_2$HPO$_4$ and 4.5 grams of KH$_2$PO$_4$ and 100 grams of succinic acid in 1000 ml of ultra-pure water. A modifier solution containing 9 grams Na$_2$HPO$_4$ and 4.5 grams of KH$_2$PO$_4$ in 1000 ml of ultra-pure water was prepared. A Hastelloy tube was filled with 12 grams of catalyst (precursor)(2% Ru/6% Re/0.6% Sn on Norit R1 Extra extrudates). After He purge, start H$_2$ flow of 1000 sccm at 138 atmospheres and ambient temperature. Start modifier solution flow at 1.7 ml/min. After 2-3 hours of flow, ramp temperature up at 1 deg C./min to 225 deg C., hold for 6 hours, and then ramp temperature down at 1 deg C./min until 200 deg C. Stop modifier flow and begin feeding reaction solution at 1.7 ml/min. This is run time zero. Examples 26-30 show the results after 21.9 to 77.9 hours of run time showing BDO selectivity of 75.1 to 79.2%. At run time 77.9 hours (Example 30), reaction feed solution was discontinued, and a reaction feed solution of 100 gm of succinic acid in 1000 ml ultra-pure water was used. As shown in Examples 31-33 with no buffer present, the selectivity to BDO drops significantly to 50.5-51.2%. At run time 102.4 hr (Example 33), the feed solution of succinic acid only in water was stopped, and the feed solution containing buffer and succinic acid in water was started. As shown in Examples 34-37, with buffer added, the selectivity to BDO increases to 75.1-78.5%. Examples 26-37 clearly show the benefits of the buffer solution on BDO selectivity.

| Example | Run Time, hr | liquid flow ml/min | Hydrogen flow, SCCM | H$_2$, Pressure, atm | Temp, ° C. | % SA feed | buffer, molar conc | Conversion SA, % | Sel (THF) | Sel (GBL) | Sel (BDO) |
|---|---|---|---|---|---|---|---|---|---|---|---|
| 26 | 21.9 | 1.7 | 1000 | 138 | 200.00 | 10% | 0.03 | 98.94% | 8.7 | 0.9 | 75.1 |
| 27 | 45.7 | 1.7 | 1000 | 138 | 200.00 | 10% | 0.03 | 98.83% | 8.7 | 1.2 | 77.3 |
| 28 | 71.1 | 1.7 | 1000 | 138 | 200.00 | 10% | 0.03 | 98.67% | 8.9 | 1.5 | 78.8 |
| 29 | 74.2 | 1.7 | 1000 | 138 | 200.00 | 10% | 0.03 | 98.61% | 8.8 | 1.7 | 79.2 |
| 30 | 77.9 | 1.7 | 1000 | 138 | 200.00 | 10% | 0.03 | 98.71% | 9.0 | 1.4 | 77.9 |
| 31 | 95.3 | 1.7 | 1000 | 138 | 200.00 | 10% | 0.00 | 100.00% | 34.3 | 0.5 | 50.5 |
| 32 | 98.7 | 1.7 | 1000 | 138 | 200.00 | 10% | 0.00 | 99.89% | 34.2 | 0.8 | 51.2 |
| 33 | 102.4 | 1.7 | 1000 | 138 | 200.00 | 10% | 0.00 | 100.00% | 34.4 | 0.4 | 50.4 |
| 34 | 120.8 | 1.7 | 1000 | 138 | 200.00 | 10% | 0.03 | 99.07% | 13.2 | 1.3 | 75.3 |
| 35 | 125.7 | 1.7 | 1000 | 138 | 200.00 | 10% | 0.03 | 98.55% | 8.6 | 1.4 | 78.5 |
| 36 | 146.2 | 1.7 | 1000 | 138 | 200.00 | 10% | 0.03 | 99.09% | 8.0 | 0.6 | 75.1 |
| 37 | 151.4 | 1.7 | 1000 | 138 | 200.00 | 10% | 0.03 | 99.00% | 8.0 | 0.7 | 76.1 |

We claim:

1. A composition comprising succinic acid and salts thereof, a pH buffer solution and a reduced metallic catalyst comprising rhenium and ruthenium.

2. The composition according to claim 1, wherein the metallic catalyst is supported.

3. The composition according to claim 1, wherein the metallic catalyst is supported on a carbon support.

4. The composition according to claim 1, wherein the metallic catalyst is supported on an oxidized or non-oxidized support.

5. The composition according to claim 1, wherein the pH buffer solution comprises Na$_2$HPO$_4$ and KH$_2$PO$_4$.

6. The composition according to claim 1, wherein the pH of the pH of the buffer solution is between about 3 and about 11.

* * * * *